United States Patent
Ono et al.

(10) Patent No.: US 7,018,487 B2
(45) Date of Patent: Mar. 28, 2006

(54) MAGNET CONTAINING LOW RARE EARTH ELEMENT AND METHOD FOR MANUFACTURING THE SAME

(75) Inventors: Hideaki Ono, Kanagawa-ken (JP); Tetsurou Tayu, Kanagawa-ken (JP); Munekatsu Shimada, Tokyo (JP); Makoto Kano, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 243 days.

(21) Appl. No.: 10/295,923

(22) Filed: Nov. 18, 2002

(65) Prior Publication Data

US 2003/0116230 A1 Jun. 26, 2003

(30) Foreign Application Priority Data

Nov. 22, 2001 (JP) .......................... P2001-356893

(51) Int. Cl.
*H01F 1/057* (2006.01)
(52) U.S. Cl. .................. 148/302; 420/83; 420/121
(58) Field of Classification Search .............. 148/302; 420/83, 121
See application file for complete search history.

(56) References Cited

U.S. PATENT DOCUMENTS

| | | | | |
|---|---|---|---|---|
| 4,767,474 A | * | 8/1988 | Fujimura et al. | 148/302 |
| 5,000,800 A | * | 3/1991 | Sagawa | 148/302 |
| 6,432,158 B1 | * | 8/2002 | Harada et al. | 75/245 |
| 6,790,296 B1 | * | 9/2004 | Kanekiyo et al. | 148/302 |
| 2002/0003006 A1 | * | 1/2002 | Nishimoto et al. | 148/102 |
| 2004/0163737 A1 | * | 8/2004 | Tomizawa et al. | 148/302 |

* cited by examiner

*Primary Examiner*—John P. Sheehan
(74) *Attorney, Agent, or Firm*—McDermott Will & Emery LLP

(57) ABSTRACT

An exchange-spring magnet is prepared using a magnet alloy containing Ta and C in addition to Nd, Fe and B. This exchange-spring magnet uses the magnet alloy prepared by a liquid quenching method or a mechanical alloying method. Further, by subjecting the magnetic alloy having a part set in an amorphous state to heat treatment, an exchange-spring magnet exhibits good properties regarding magnetic flux density and coercive force.

13 Claims, 6 Drawing Sheets

TaC  50nm

50nm

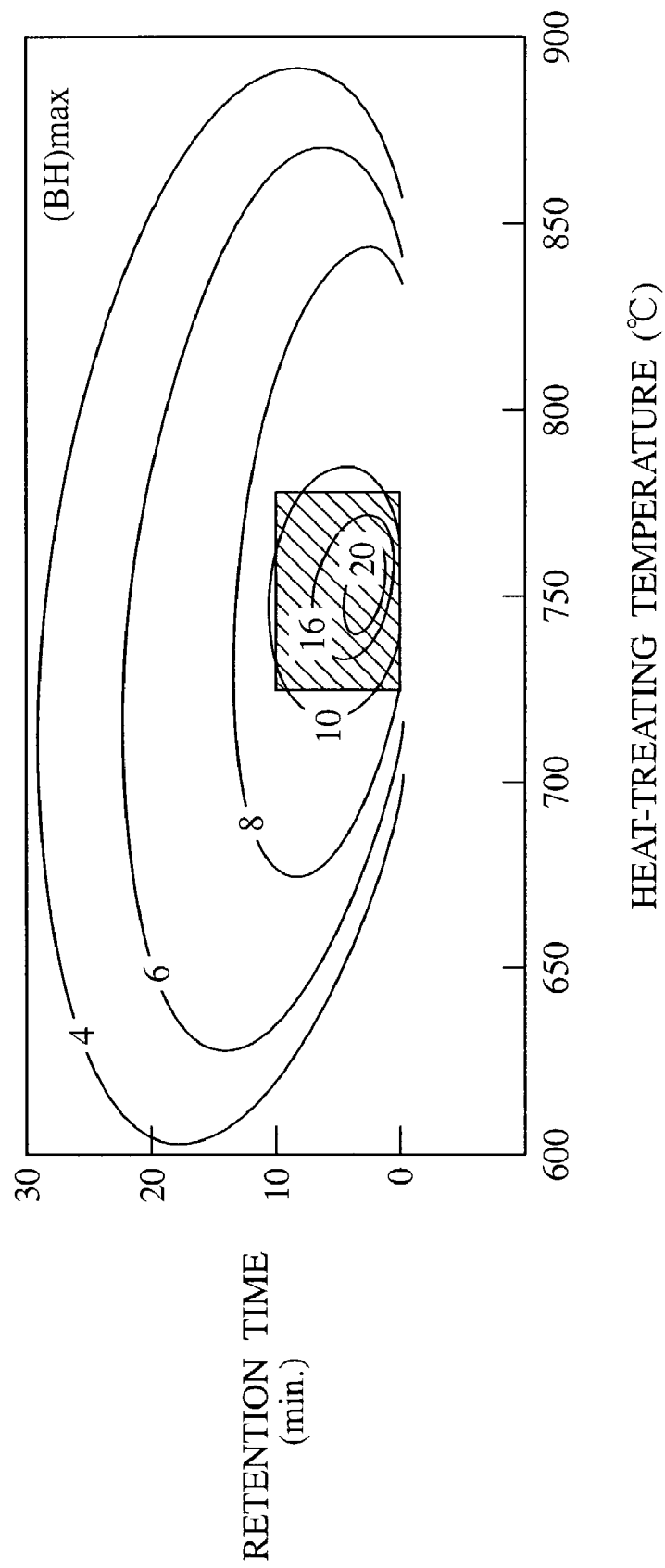

MAGNET CONTAINING LOW RARE EARTH ELEMENT AND METHOD FOR MANUFACTURING THE SAME

BACKGROUND OF THE INVENTION

1. Field of the Invention

The present invention relates to an exchange-spring magnet, and a method for manufacturing thereof. More specifically, the invention relates to an exchange-spring magnet having excellent magnetic properties, and a method for manufacturing thereof.

2. Description of the Related Art

An exchange-spring magnet containing a mixture of permanent magnetic phase (hard phase) and a soft magnetic phase (soft phase) in nano-size is currently attracting attention as a novel magnet material. As the exchange-spring magnet contains the soft phase of a high magnetic flux density, a magnetic flux density of the entire magnet is increased. Thus, a dramatic improvement of magnetic properties is enabled. The development of the exchange-spring magnet has been pursued in connection with a composition system where the hard phase contains Neodymium-Iron-Boron, and the soft phase contains Iron or Iron-Boron.

A real exchange-spring magnet shows high magnetic properties in the amount of the rare earth element set within a range of 8 to 9 atom %. However, micromagnetics simulation provides a possibility of further improvement of the magnetic properties by forming a low rare earth element composition, i.e., a composition of a large soft phase content. This is attributed to the fact that since the soft phase has a high magnetic flux density as described above, the magnetic flux density of the entire magnet is set higher by increasing the soft phase content.

SUMMARY OF THE INVENTION

However, in actual manufacturing of an exchange-spring magnet containing a smaller amount of rare earth element, and a higher soft phase content, it has been difficult to show high magnetic properties similar to that in the foregoing simulation. The cause thereof was an increase in a crystal grain size of the magnet in accordance with the increase of the soft phase content. That is, when the soft phase is increased, a grain size of the exchange-spring magnet is increased in the manufacturing process, leading to a reduction in an exchange coupling force between the soft phase and the hard phase. Therefore, a coercive force has been extremely low compared to that of the simulation, causing a reduction in the magnetic properties of the exchange-spring magnet.

The present invention has been made in consideration of the above problems. The object thereof is to provide an exchange-spring magnet having a very small crystal grain size and exhibiting good properties regarding both magnetic flux density and coercive force even if soft phase content of the magnet is increased, and to provide a magnet alloy as a material for the exchange-spring magnet. It is another object of the invention to provide a method for manufacturing the exchange-spring magnet.

As a magnet alloy used in the process of manufacturing an exchange-spring magnet, the inventors of the present invention use an alloy containing Tantalum (Ta) and Carbon (C) in addition to Neodymium (Nd), Iron (Fe) and Boron (B). Accordingly, an exchange-spring magnet exhibiting good properties regarding both of a magnetic flux density and a coercive force has been obtained. In other words, the present invention is a result of a discovery that by adding Ta and C into the magnet alloy, crystal growth of a α-Fe phase can be suppressed, and a crystal grain size of the exchange-spring magnet thus obtained can be micronized. Specific aspects of the present invention are as follows.

The first aspect of the present invention provides a magnet alloy, comprising: Neodymium; Iron; Boron; Tantalum; and Carbon.

The second aspect of the present invention provides an exchange-spring magnet, comprising: a magnet alloy including Neodymium, Iron, Boron, Tantalum, and Carbon, wherein the exchange-spring magnet contains a α-Fe phase, a $Nd_2Fe_{14}B$ phase, and a TaC phase.

The third aspect of the present invention provides a method for manufacturing an exchange-spring magnet, comprising: preparing a magnet alloy including Neodymium, Iron, Boron, Tantalum and Carbon; making the magnet alloy having at least a part thereof set in an amorphous state by a liquid quenching method or a mechanical alloying method; and subjecting the magnet alloy containing the amorphous state to heat treatment.

The fourth aspect of the present invention provides a motor, comprising: an exchange-spring magnet, the exchange-spring magnet, comprising: a magnet alloy including Neodymium, Iron, Boron, Tantalum and Carbon, wherein the exchange-spring magnet contains a α-Fe phase, a $Nd_2Fe_{14}B$ phase and a TaC phase.

The fifth aspect of the present invention provides a sensor, comprising: an exchange-spring magnet, the exchange-spring magnet, comprising: a magnet alloy including Neodymium, Iron, Boron, Tantalum and Carbon, wherein the exchange-spring magnet contains a α-Fe phase, a $Nd_2Fe_{14}B$ phase, and a TaC phase.

BRIEF DESCRIPTION OF THE DRAWINGS

The invention will now be described with reference to the accompanying drawings, wherein:

FIG. 5 is a graph showing a relation of investigation between a heat-treating condition and magnetic properties.

DETAILED DESCRIPTION OF THE PREFERRED EMBODIMENT

Figure 1:
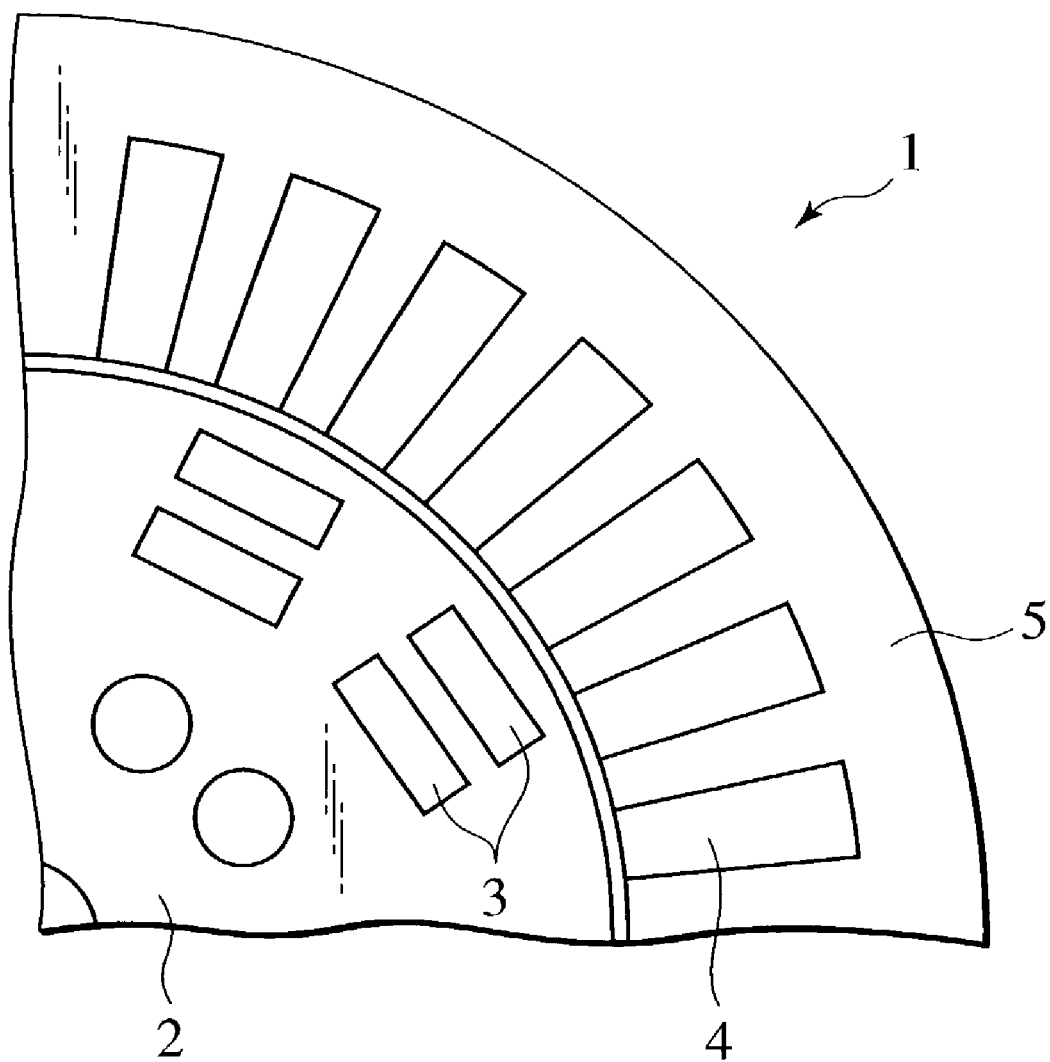
FIG. 1 is a view showing an example, in which an exchange-spring magnet of the present invention is applied to a driving motor.

To describe the present invention in more detail, preferred embodiments of the present invention will be explained with reference to the drawings below.

In accordance with the present invention, a magnetic alloy contains Tantalum (Ta) and Carbon (C) in addition to Neodymium (Nd), Iron (Fe) and Boron (B). An exchange-spring magnet generally comprises a hard phase of an $Nd_2Fe_{14}B$ phase, and a soft phase of a α-Fe phase, and shows good magnetic properties by maintaining a very small crystal grain size of a nanometer order. Thus, suppression of crystal grain grown has a great effect on magnetic properties. According to the present invention, crystal growth is suppressed by further containing Ta and C in the magnetic alloy.

The exchange-spring magnet mixed with very small crystals of a nanometer older can be manufactured by first forming an intermediate of an amorphous state from the magnet alloy by a liquid quenching method, a mechanical alloying method or the like. Then, the exchange-spring magnet can be manufactured by subjecting the intermediate to heat treatment. In the present invention, the intermediate of the amorphous state contains Ta and C. Affinity is high for Ta and C, and these elements are preferentially bonded to form a TaC compound in a crystallization process by the heat treatment. Then, a TaC phase of the TaC compound is provided on a grain boundary of a α-Fe phase, thereby suppressing crystal growth of the α-Fe phase. Thus, the exchange-spring magnet manufactured has a small crystal grain size, i.e., a high coercive force. Even when the amount of rare earth elements is reduced, and soft phase content is increased, an exchange-spring magnet having a very small crystal grain size can be obtained. Therefore, when the soft phase content is increased, it is possible to obtain an exchange-spring magnet having good properties regarding both of magnetic flux density and coercive force. Moreover, good magnetic properties can be showed only by adjusting alloy composition, and it is possible to reduce manufacturing costs thereof.

There is no particular limitation placed on the content of each element in the magnet alloy. However, considering magnetic properties of an exchange-spring magnet to be manufactured, and the amount of hard and soft phases to be formed, contents should be preferably set in the following ranges. An element content can be controlled by adjusting a blending amount of elements when the magnet alloy is adjusted.

An amount of Nd is preferably set to 5 atom % or more, because if the amount thereof is too small, there is a risk that a coercive force may be reduced when the exchange-spring magnet is manufactured. However, if the amount thereof is too large, there is a risk that magnetic properties may be reduced when the exchange-spring magnet is manufactured, because of the smaller occupation ratio of the soft phase. Accordingly, an amount of Nd is preferably set to 7 atom % or lower. To increase a coercive force, a part of Nd may be a composition which is substituted with one or more element selected from the group consisting of Praseodymium (Pr), Dysprosium (Dy), Terbium (Tb) and Holmium (Ho). In such a case, preferably, a total amount of Pr, Dy, Tb and Ho in the magnet alloy is set within a range of 0.01 to 35 atom % with respect to a total amount of Nd, Pr, Dy, Tb and Ho, more preferably within a range of 10 to 20 atom %. In this range, the coercive force can be increased with almost no reductions in residual magnetic flux density.

An amount of Fe is preferably set to 72 atom % or more, because if the amount 0.5 thereof is too small, there is a risk that a magnetic flux density of the exchange-spring magnet may be reduced. However, if the amount thereof is too large, there is a risk that the coercive force may be reduced. Thus, an amount of Fe is preferably set to 88 atom % or lower. For the purpose of increasing a Curie point, a composition may be employed, in which a part of Fe is substituted with Cobalt (Co). In such a case, preferably, an amount of Co is set within a range of 0.01 to 50 atom % with respect to a total amount of Fe and Co, more preferably within a range of 20 to 30 atom %. In this range, a magnetic flux density itself can be increased in addition to an improvement of a temperature characteristic without any reductions in the coercive force or the magnetic flux density.

An amount of B is preferably set to 4 atom % or more, because there is a risk that a hard phase amount may be reduced if the amount thereof is too small. However, if the amount thereof is too large, there is a risk that other phases may be generated, which will induce a reduction in the magnetic properties. Thus, An amount of B is preferably set to 12 atom % or lower.

An amount of Ta is preferably set to 1.5 atom % or more, because if the amount thereof is too small, there is a risk that a sufficient crystal grain growth suppressing effect of the present invention may not be obtained. However, there is a possibility that the magnetic properties may be conversely reduced if the amount thereof is too large. Thus, an amount of Ta is preferably set to 4.5 atom % or lower.

An amount of C is preferably set to 1.5 atom % or more, because there is a risk that a sufficient crystal grain growth suppressing effect of the present invention may not be obtained if the amount thereof is too small. However, there is a possibility that the magnetic properties may be conversely reduced if the amount thereof is too large. Thus, an amount of C is preferably set to 4.5 atom % or lower.

Contents of Nd, Fe, Ta, C and B in the magnet alloy are represented by the following formula (1):

$$Nd_aFe_{100-a-b-2x}(TaC)_xB_b \quad (1)$$

(In the formula (1), a is 5 to 7, b is 4 to 12, and x is 1.5 to 4.5)

In the magnet alloy, other elements may be added insofar as causing no losses of the effects of the present invention. For example, Aluminum (Al), Molybdenum (Mo), Zirconium (Zr), Titanium (Ti), Tin (Sn), Copper (Cu), Gallium (Ga), Niobium (Nb) and the like may be contained in the alloy in order to improve the magnetic properties. Contamination of a small amount of impurities is inevitable in the magnet alloy of the present invention, because it is an alloy material. However, a smaller amount of impurities is better, preferably 1 wt. % or below. The same holds true for the exchange-spring magnet made of the magnet alloy.

From the magnet alloy of the present invention, an exchange-spring magnet can be manufactured, which contains a α-Fe phase as a soft phase, an $Nd_2Fe_{14}B$ phase as a hard phase, and a TaC phase. There is no particular limitation placed on the amount of rare earth element contained in the exchange-spring magnet. However, if the rare earth element is reduced to increase the soft phase, from the standpoint of making utmost use of the effects of the present invention, i.e., the capability of manufacturing the exchange-spring magnet having good properties regarding the magnetic flux density and the coercive force, a smaller amount of rare earth element contained in the exchange-spring magnet is more preferable, specifically within a range of 5 to 7 atom N.

Preferably, a crystal grain size of the α-Fe phase in the exchange-spring magnet is set within a range of 5 to 40 nm. If a crystal grain size is less than 5 nm, the hard and soft phases may become unstable in structure. Conversely, if a crystal grain size exceeds 40 nm, exchange function between the hard and soft phases may be reduced, causing the risk of lowering the magnetic property of the exchange-spring magnet. A crystal grain size of the α-Fe phase of the exchange-spring magnet can be calculated from a full width at half maximum intensity of a diffraction peak from a α-Fe phase of an X-ray diffraction pattern by using Scherrer equation (D=0.9 λ/β cos θ).

Next, description will be made of a method for manufacturing an exchange-spring magnet according to the present invention.

First, metal elements are adjusted and blended so as to achieve a desired composition. Then, a magnet alloy is prepared in vacuum or argon atmosphere by using well-known means such as high frequency induction melting. In the present invention, by simultaneously blending Ta and C with Nd, Fe and B, crystal grain growth can be suppressed in later-described heat treatment.

Subsequently, an alloy having at least a part set in an amorphous state is obtained as an intermediate by using the liquid quenching method or the mechanical alloying method to process the obtained magnet alloy. If the liquid quenching method is used, a rapidly quenched ribbon is obtained. As the liquid quenching method, a melt spanning method can be used. However, for the liquid quenching method, a well-known device can be used, and no special improvements are necessary. But improvements are not excluded. An operation condition cannot be uniquely decided as it must be properly decided according to a device to be used, or a type of an alloy. Especially, attention must be paid to a cooling velocity. When it is too fast or too slow, adverse effects such as a loss of uniformity of the rapidly quenched ribbon occur. The cooling velocity has a close relation to a thickness of the rapidly quenched ribbon, therefore the cooling velocity is adjusted so as to set a thickness of the obtained rapidly quenched ribbon within a range of 10 to 200 μm in general. Also, for the mechanical alloying method, various well-known devices can be used. However, improvements are not excluded. An operation condition may be set properly according to a device to be used, or a type of an alloy.

For the alloy prepared by the liquid quenching method or the mechanical alloying method, preferably, an amorphous content is set within a range of 50 to 90 wt. %. If an amorphous content is less than 50 wt. %, since many parts thereof have been made crystalline, there is a risk that an end crystal grain size of the exchange-spring magnet to be manufactured may be adversely increased. On the other hand, if an amorphous content exceeds 90 wt. %, there is a risk that an end crystal grain size of the exchange-spring magnet to be manufactured may be adversely increased. The amorphous content can be adjusted by controlling a condition of the liquid quenching method. Specifically, the amorphous content can be adjusted by controlling a roll peripheral velocity during liquid quenching, or controlling a revolution speed and time during mechanical alloying. The amorphous content in the alloy can be measured by using a temperature characteristic of magnetization.

Subsequently, the alloy including the amorphous state as the intermediate is crystallized by heat treatment. In the heat treatment, preferably, a treating temperature is set within a range of 725 to 775° C. In this range, it is possible to effectively improve the magnetic properties of the exchange-spring magnet to be manufactured. The treating temperature means a highest temperature in the alloy heat treatment. In addition, preferably, retention time in the heat treatment is set within a range of 0 to 10 min. In this range, it is possible to obtain an exchange-spring magnet having good magnetic properties. The retention time means retention time in the heat treating temperature, and 0 min. of the retention time means that a temperature reduction is started immediately after the heat treating temperature is reached. A retention time of 0 to 10 min., within a range of 725 to 775° C. may be set. In such a case, a retention temperature may be changed continuously or in steps. Preferably, the heat treatment atmosphere is vacuum or inert gas atmosphere. Specifically, high vacuum of $10^{-3}$ Pa or lower is used, and nitrogen, argon or helium can be used for inert gas.

After the formation of the crystallized alloy into a desired shape, an exchange-spring magnet can be obtained by carrying out magnetization. The alloy may be magnetized without any special processing. The magnetization can be carried out by using a static magnetic field or a pulse magnetic field. Considering mass-productivity, the pulse magnetic field is preferably used.

To form the crystallized alloy into a desired shape, various well-known technologies can be used, and no particular limitation is placed. For example, a bond magnet can be obtained by crushing a ribbon-shaped exchange-spring magnet into powder, mixing the powder with plastic and molding it. For the crushing, various crusher, can be used, for example a jaw crusher, a braun mill, a ball mill, a sand mill, a vibration mill, a jet mill, and a pin mill and the like. The ball mill is preferred from the standpoint of submicron crushing. Needless to say, these crushers may be used in combination. The ball mill may be of a wet or dry type. Preferably, the crushing is carried out in non-oxidative atmosphere (argon atmosphere, nitrogen atmosphere or the like) to prevent the deterioration of the magnetic properties caused by oxidation of the magnet powder. For the wet ball mill, cyclohexane or the like can be used. Dispersant is preferably used to suppress aggregation of the magnet powder. The dispersant provides preferable effects for the magnetic orientation. As the dispersant, succinic acid can be used for the wet type, and stearic acid for the dry type. The alloy may be processed into a bulk magnet. In the case of processing the alloy into the bulk magnet, preferably, a density of the bulk magnet is set close to a true density of the magnet alloy as a raw material from the standpoint of increasing an energy product, specifically a true density of 95% or higher. Following the modeling of the exchange-spring magnet, surface treatment such as plating can be executed.

Figure 2:
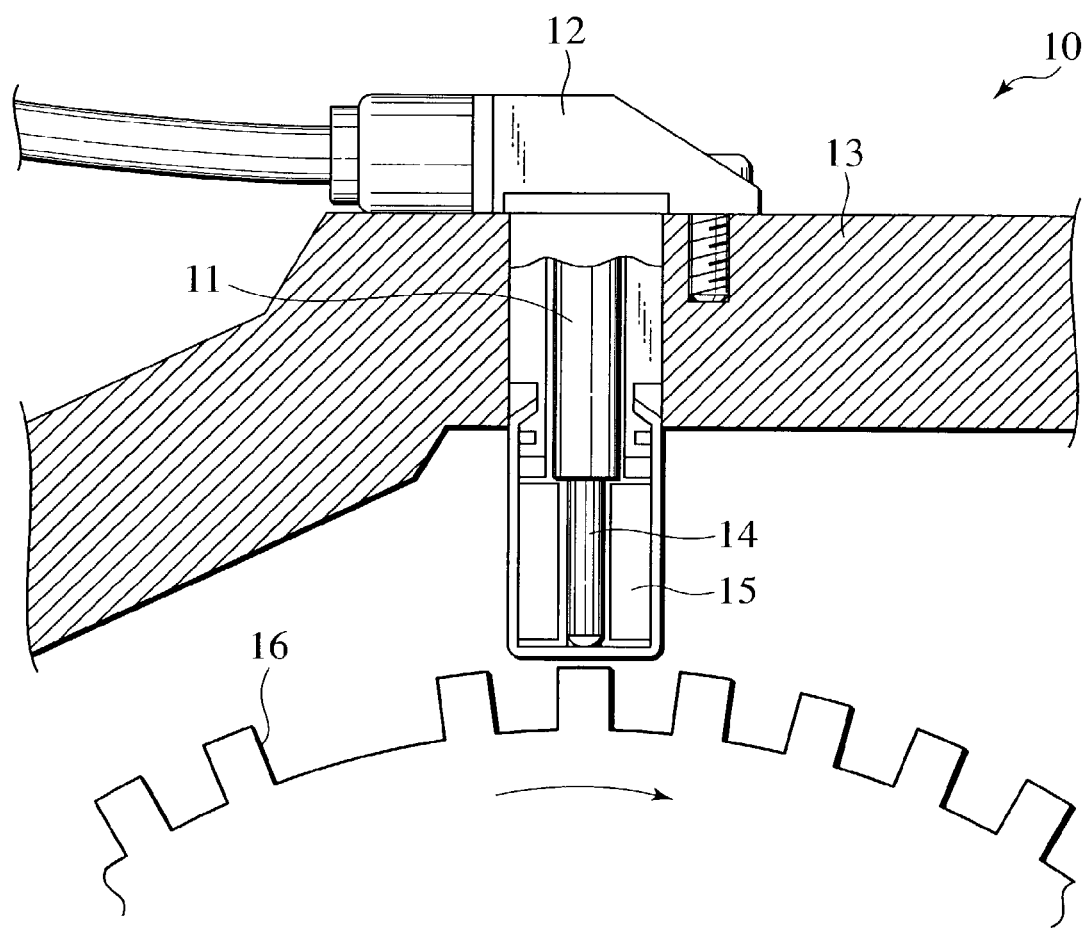
FIG. 2 is a view showing an example, in which the exchange-spring magnet of the present invention is applied to an inductive sensor.

The exchange-spring magnet of the present invention can be applied to various devices, which need magnets, for example a motor, a sensor (magnetic field sensor, a rotation sensor, an acceleration sensor, a torque sensor, or an inductive sensor), and the like. When the exchange-spring magnet is applied to those devices, the product can be reduced in size and weight. For example, in the case of application to an automobile component, it is possible to greatly improve fuel economy in accordance with the reduction in weight of a car body. Especially, it is effective to apply the exchange-spring magnet to a driving motor of an electric automobile, or a hybrid electric automobile. The driving motor can be installed in a place where it has been difficult to secure a space, and expected to play a great role in popularization of the electric automobile or the hybrid electric automobile. FIG. 1 shows an example of applying the exchange-spring magnet of the present invention to a driving motor 1. Reference numeral 2 denotes a rotor, reference numeral 3 denotes a magnet of the present invention, reference numeral 4 denotes a slot (winding), and reference numeral 5 denotes a stator. FIG. 2 shows an example of applying the exchange-spring magnet of the present invention to an inductive sensor 10. Reference numeral 11 denotes an exchange-spring magnet of the invention; reference numeral 12 denotes a housing, reference numeral 13 denotes an engine housing, reference numeral 14 denotes a soft-iron core, reference numeral 15 denotes a winding, and reference numeral 16 denotes a ring gear. The inductive sensor 10 includes the magnet 11 with the soft-iron core 14 supporting the winding 15 with two connections. When the ferromagnetic ring gear 16 (or a rotor of similar design) turns past this sensor 10, it generates a voltage in the winding 15 which is directly proportional to the periodic variation in the magnetic flux. Hence, it is possible to confirm the rotating speed.

Now, effects of the present invention will be described with reference to the following examples. However, it should be understood that a technological scope of the present invention is not limited to the examples.

1. Investigation of the Effect of Ta and C on Magnetic Properties

An alloy having a composition shown in Table 1 below was prepared by high frequency induction melting. Subsequently, a rapidly quenched ribbon was formed by use of the single roll liquid quenching method. A roll peripheral velocity in this case was Vs=40 m/s. The obtained rapidly quenched ribbon was subjected to a heat treatment of 750° C.×1 min. in vacuum, and an exchange-spring magnet was formed by a pulse magnetization of 10 T. A temperature was increased at 22° C./min. until 750° C. Magnetic properties of the obtained exchange-spring magnet were measured by a vibrating sample magnetometer (VSM). Table 1 shows magnetic properties. As is apparent from Table 1 by adding Ta and C into the alloy composition, a coercive force (HcJ) and a residual magnetic flux density (Br) of the obtained exchange-spring magnet were improved, confirming an improvement of a maximum energy product (BH)max.

TABLE 1

| | Alloy Composition | Br (kG) | HcJ (kOe) | (BH)max (MGOe) |
|---|---|---|---|---|
| Example 1 | $Nd_6Fe_{84}Ta_2C_2B_6$ | 11.5 | 5.5 | 16.0 |
| Example 2 | $Nd_6Fe_{82}Ta_3C_3B_6$ | 12.0 | 5.1 | 17.5 |
| Example 3 | $Nd_6Fe_{80}Ta_4C_4B_6$ | 11.7 | 6.2 | 17.2 |
| Comparative Example 1 | $Nd_6Fe_{88}B_6$ | 10.1 | 2.5 | 8.2 |

Figure 3A:
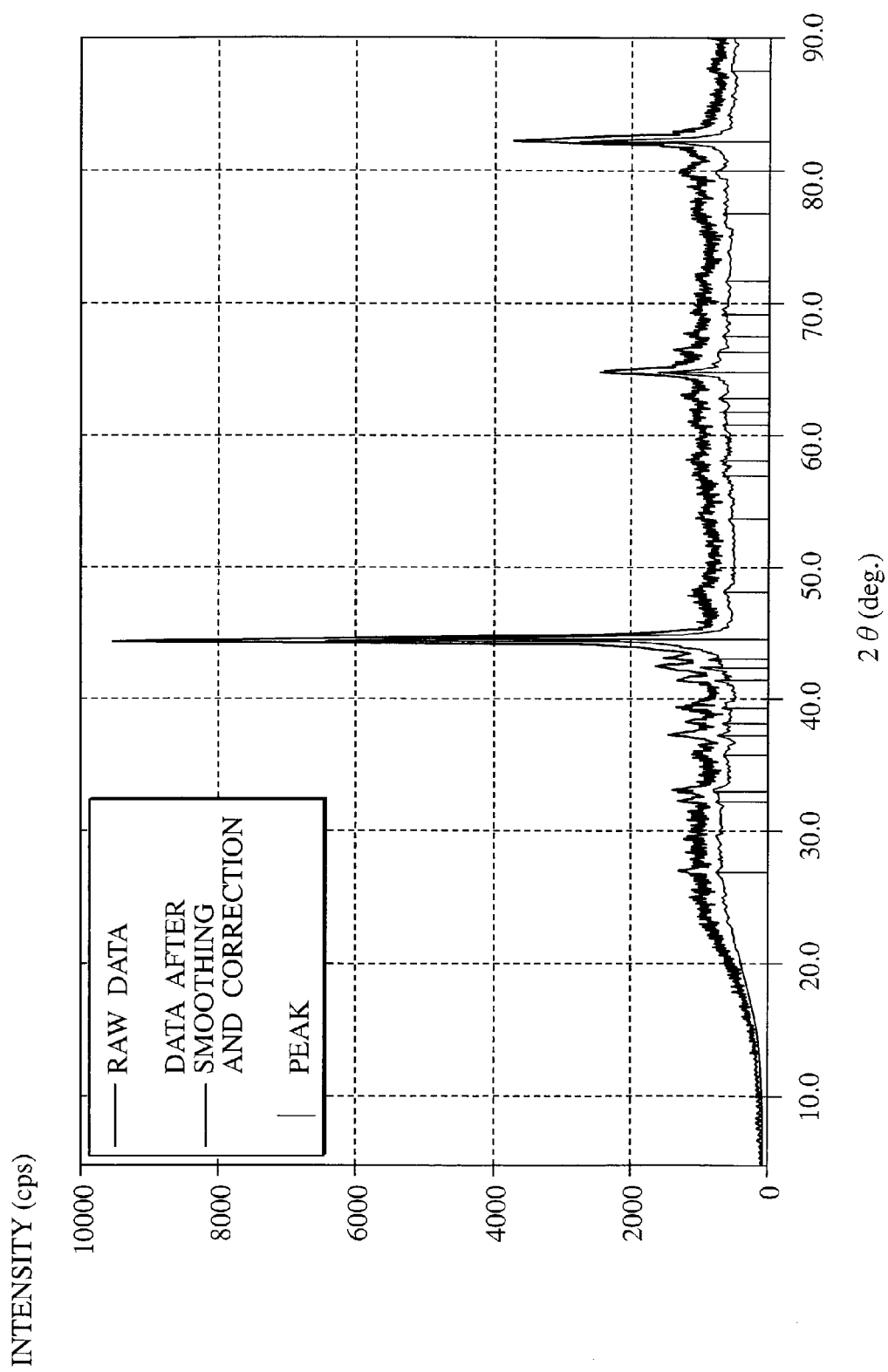
FIG. 3A is a view showing a change of an X-ray diffraction pattern in accordance with a change of a heat-treating temperature of an exchange-spring magnet, to which Ta and C are added.
Figure 3B:
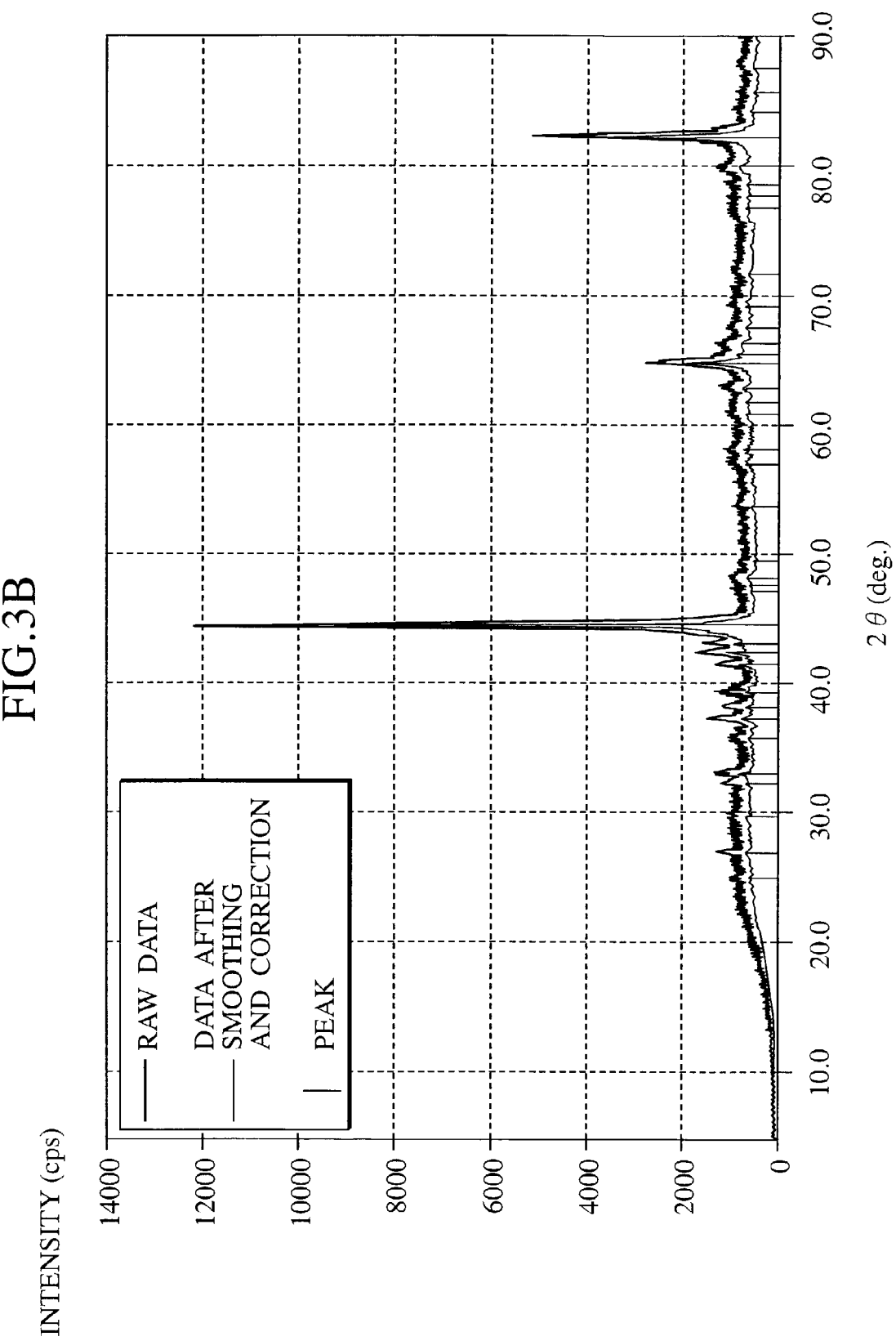
FIG. 3B is a view showing a change of an X-ray diffraction pattern in accordance with a change of a heat-treating temperature of an exchange-spring magnet, which neither Ta nor C is added.

Observation was made of changes in an X-ray diffraction pattern (XRD) in accordance with changes in a temperature of the heat treatment. The case of the addition of Ta and C (example 1) is shown in FIG. 3A, and the case of no addition of Ta and C (comparative example 1) is shown in FIG. 3B. FIGS. 3A and 3B show raw data, and data after smoothing of the raw data and correction made using a silicon single crystal. When a crystal grain size of a α-Fe phase was compared from the full width at half maximum intensity of a diffraction peak from the α-Fe phase by using Scherrer equation (D=0.9 λ/β cos θ), a crystal grain size of a sample of the embodiment 1 was 25 nm. On the other hand, a crystal grain size of a sample of the comparative example 1 was 50 nm. In the Scherrer equation, D denotes a crystal grain size, λ denotes a measured X-ray wavelength (1.54 Å), β denotes the full width at half maximum intensity of a peak, and θ denotes a measured angle of a peak position. β was corrected by using the full width at half maximum intensity of the Si single crystal sample. The crystal grain sizes of this example were calculated by using peaks of 2θ=44.59° in FIG. 3A and 2θ=44.60° in FIG. 3B. The full width at half maximum intensity of 2θ=44.59° in FIG. 3A is 0.36°, and the full width at half maximum intensity after the correction using the Si single crystal was 0.34°. The full width at half maximum intensity of a peak of 2θ=44.60° in FIG. 3B was 0.20°, and the full width at half maximum intensity after the correction using the Si single crystal was 0.17°.

The foregoing results showed that in the exchange-spring magnet of the present invention, exchange bonding was effectively carried out between the soft phase and the hard phase.

Figure 4A:
FIG. 4A is a TEM view of the exchange-spring magnet, to which Ta and C are added.
Figure 4B:
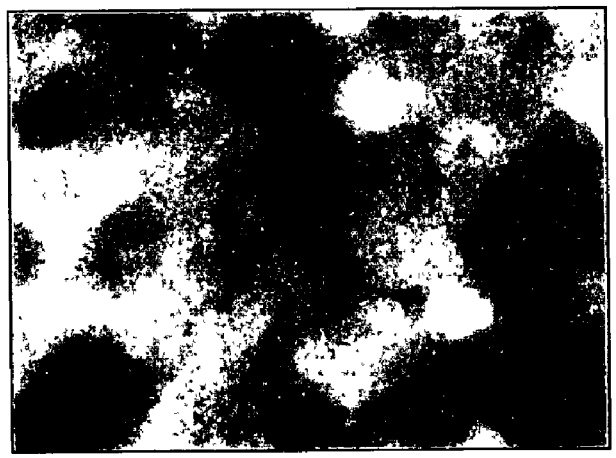
FIG. 4B is a TEM view of the exchange-spring magnet, to which neither Ta nor C is added.

In addition, checking was made on microstructures of the exchange-spring magnet containing Ta and C (example 1), and the exchange-spring magnet containing no such elements (comparative example 1) by a transmission electron microscope (TEM). FIG. 4A shows the exchange-spring magnet containing Ta and C, while FIG. 4B shows the exchange-spring magnet of no such elements. As shown in FIG. 4A, in the exchange-spring magnet containing Ta and C, a very small TaC phase was deposited, confirming suppression of crystal grain growth of the α-Fe phase. As shown in FIG. 4B, however, in the case of the exchange-spring magnet of no Ta or C, crystal grain growth of the α-Fe phase was confirmed.

2. Investigation of the Effect of Substitution with Dy and Co on Magnetic Properties.

In order to evaluate effects of substitution of a part of Nd with Dy, and a part of Fe with Co, as $Nd_6Fe_{80}(TaC)_4B_6$ is set to a basic composition, a part of Nd or Fe was substituted with Dy and Co so as to have the composition shown in Table 2. A method for manufacturing an exchange-spring magnet was compliant with the foregoing "1. Investigation of the effect of Ta and C on magnetic properties". As apparent from Table 2, by substituting a part of Nd with Dy, a coercive force of the exchange-spring magnet was increased. Moreover, by substituting a part of Fe with Co, a Curie point of the exchange-spring magnet was increased.

TABLE 2

| | Alloy Composition | Br (kG) | HcJ (kOe) | (BH)max (MGOe) | Curie point (° C.) |
|---|---|---|---|---|---|
| Embodiment 4 | $Nd_6Dy_1Fe_{80}Ta_4C_4B_6$ | 11.9 | 5.8 | 19.0 | 761 |
| Embodiment 5 | $Nd_4Dy_2Fe_{80}Ta_4C_4B_6$ | 11.8 | 6.6 | 18.9 | 761 |
| Embodiment 6 | $Nd_6Fe_{72}Co_8Ta_4C_4B_6$ | 12.0 | 5.2 | 17.7 | 890 |
| Embodiment 7 | $Nd_6Fe_{64}Co_{16}Ta_4C_4B_6$ | 12.0 | 5.4 | 17.2 | 940 |
| Embodiment 3 | $Nd_6Fe_{80}Ta_4C_4B_6$ | 12.0 | 5.1 | 17.5 | 760 |

3. Investigation of the Relationship Between Heat Treating Condition and Magnetic Properties By using an alloy having a composition of $Nd_6Fe_{80}(TaC)_4B_6$, an exchange-spring magnet was prepared by a method similar to the foregoing "1. Investigation of the effect of Ta and C on magnetic properties". In this case, observation was made of a change in (BH)max by changing a temperature of the heat treatment and a retention time. A result is shown in FIG. 5. A magnet having good magnetic properties were obtained in a temperature of the heat treatment within a range of 725 to 775° C. In addition, an exchange-spring magnet having a good magnetic properties were obtained in a retention time within a range of 0 to 10 min.

The entire content of a Japanese Patent Application No. P2001-356893 with a filing date of Nov. 22, 2001 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An exchange-spring magnet comprising:
   a magnet alloy including Neodymium, Iron, Boron, Tantalum, and Carbon,
   wherein the exchange-spring magnet contains an α-Fe phase, a $Nd_2Fe_{14}B$ phase, and a TaC phase, and
   wherein an amount of Carbon is within a range from 1.5 to 4.5 atom %, and an amount of Tantalum is within a range from 1.5 to 4.5 atom %.

2. An exchange-spring magnet according to claim 1, wherein the α-Fe phase has a crystal grain size set within a range of 5 to 40 nm.

3. An exchange-spring magnet according to claim 1, wherein a part of the Neodymium is substituted with Dysprosium.

4. An exchange-spring magnet according to claim 1, wherein a part of the Iron is substituted with Cobalt.

5. An exchange-spring magnet according to claim 1, wherein the TaC phase is provided on a grain boundary of the α-Fe phase.

6. A motor, comprising:
   an exchange-spring magnet, the exchange-spring magnet comprising:
      a magnet alloy including Neodymium, Iron, Boron, Tantalum, and Carbon,
   wherein the exchange-spring magnet contains an α-Fe phase, a $Nd_2Fe_{14}B$ phase, and a TaC phase, and wherein an amount of Carbon is within a range from 1.5 to 4.5 atom %, and an amount of Tantalum is within a range from 1.5 to 4.5 atom %.

7. A motor according to claim 6, wherein a part of the Neodymium is substituted with Dysprosium.

8. A motor according to claim 6, wherein a part of the Iron is substituted with Cobalt.

9. A motor according to claim 6, wherein the TaC phase is provided on a grain boundary of the α-Fe phase.

10. A sensor, comprising:
    an exchange-spring magnet, the exchange spring magnet comprising:
       magnet alloy including Neodymium, Iron, Boron, Tantalum, and Carbon,
    wherein the exchange-spring magnet contains an α-Fe phase, a $Nd_2Fe_{14}B$ phase, and a TaC phase, and wherein an amount of Carbon is within a range from 1.5 to 4.5 atom %, and an amount of Tantalum is within a range from 1.5 to 4.5 atom %.

11. A sensor according to claim 10, wherein a part of the Neodymium is substituted with Dysprosium.

12. A sensor according to claim 10, wherein a part of the Iron is substituted with Cobalt.

13. A sensor according to claim 10, wherein the TaC phase is provided on a grain boundary of the α-Fe phase.

* * * * *